J. L. ANDERSON.
ELEVATING TRUCK.
APPLICATION FILED APR. 18, 1918.
1,312,089.
Patented Aug. 5, 1919.
2 SHEETS—SHEET 2.
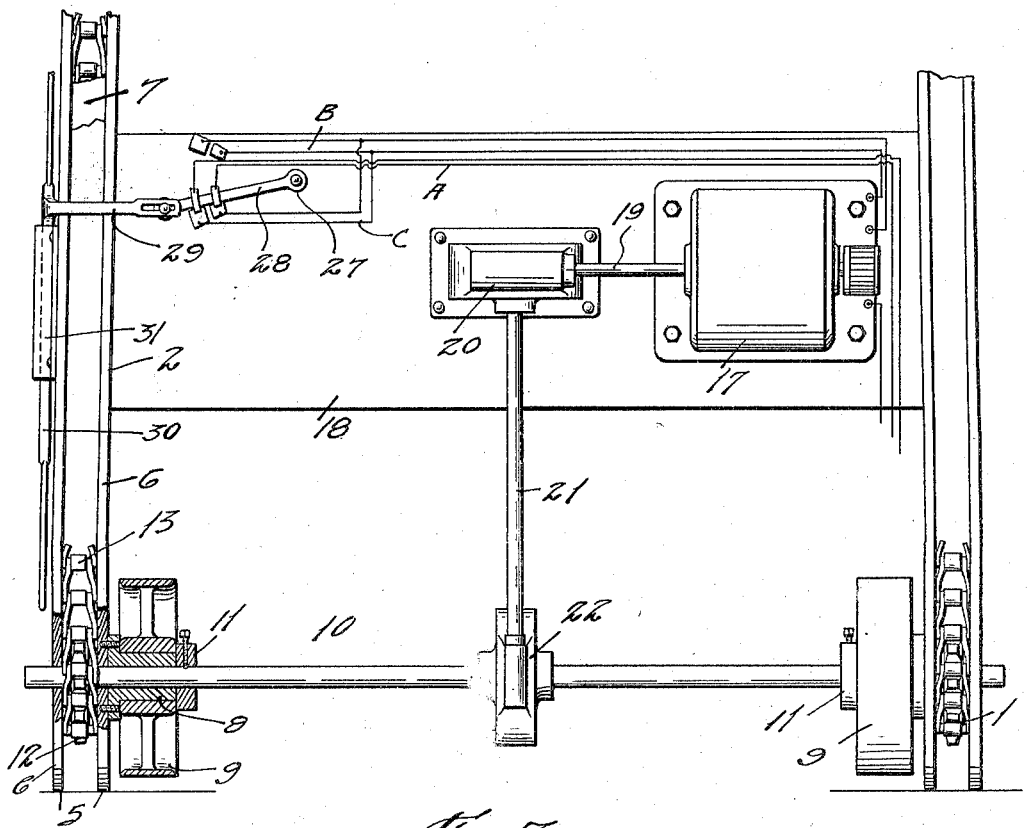
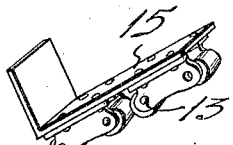
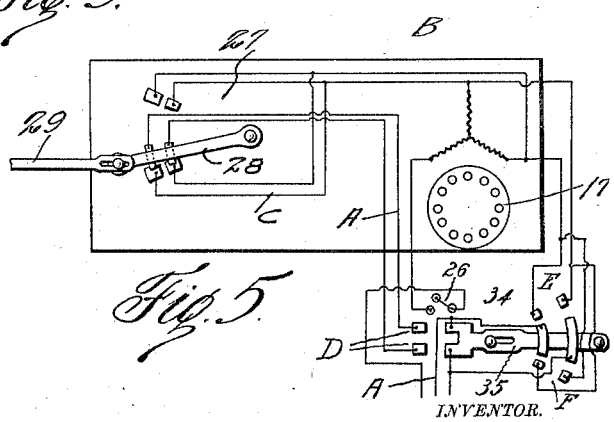
INVENTOR.
J. L. ANDERSON
BY
ATTORNEY.

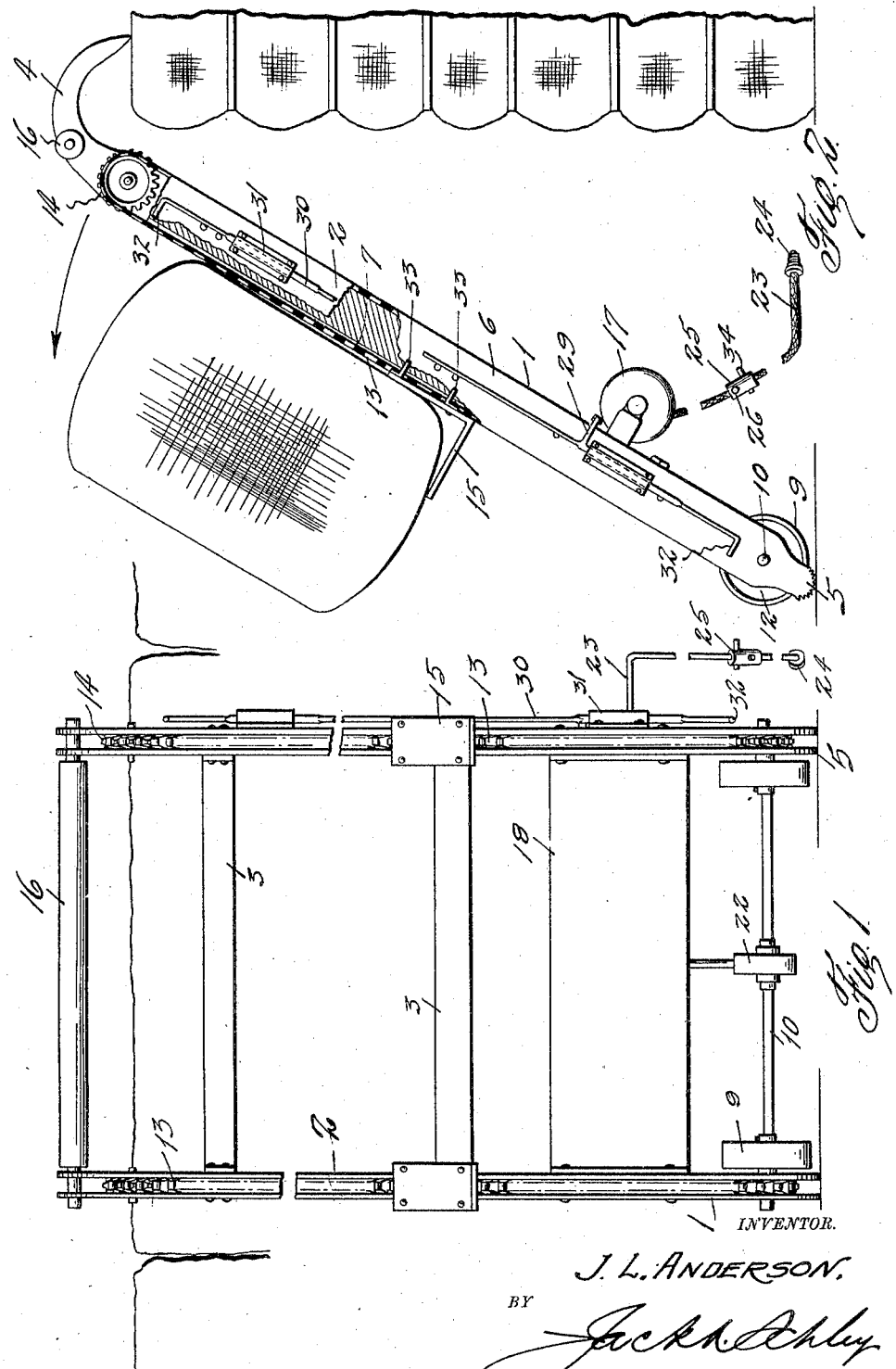

UNITED STATES PATENT OFFICE.

JOHN L. ANDERSON, OF ITALY, TEXAS, ASSIGNOR OF ONE-HALF TO B. W. J. WOFFORD, OF ITALY, TEXAS.

ELEVATING-TRUCK.

1,312,089.  Specification of Letters Patent.  Patented Aug. 5, 1919.

Application filed April 18, 1918. Serial No. 229,253.

*To all whom it may concern:*

Be it known that I, JOHN L. ANDERSON, a citizen of the United States, residing at Italy, in the county of Ellis and State of Texas, have invented certain new and useful Improvements in Elevating-Trucks, of which the following is a specification.

This invention relates to new and useful improvements in elevating and conveying devices, and particularly to an elevating truck.

In handling certain commodities it is necessary to pile one upon the other or to "deck" the same. This is particularly true in loading freight cars with bales of cotton. Where the object to be elevated is quite heavy as for instance a bale of cotton which weighs from 500 to 600 pounds, six or seven men are generally required to put the second bale upon top of the first bale. A conveyer might easily be designed for doing this work, but the elevating device must be portable so as to be moved as the load is built up. I do not wish to leave the impression that the invention is limited to loading cotton.

I have conceived the idea of constructing a truck which would be easily moved about and placed in position by one or two men and to equip said truck with a conveyer which would act as an elevator when the truck was placed in position for loading. In order to make the device highly efficient it is proposed to place an electric motor thereon for driving the conveyer and placing the same under the control of a single operator.

In carrying out the invention a truck frame is provided and arranged to be supported on an incline when in use and equipped with wheels for readily transporting it. The truck frame is equipped with a conveyer which has provision for receiving the article to be elevated and carrying the same longitudinally of the frame. An electric motor is mounted on the frame to drive the conveyer and it is proposed to also provide a reversing switch for the motor so that the conveyer will be reversed at each end of its travel automatically; however the operator is also provided with a hand-switch whereby he may control the operation of the conveyer and motor.

In a more specific embodiment of the invention an elongated frame is provided and formed with laterally extending supporting members at one end and floor engaging means at the other end whereby the frame is securely positioned. Conveyer chains are mounted at each side of the frame and have loading carriers mounted thereon. Truck wheels are mounted at the lower end of the frame so as to be held above the floor when the truck is in operation, but to support the lower end of the truck when the same is being transported. An electric motor driving unit is mounted on the frame for driving the conveyer chains and is started and stopped by a hand-switch. A reversing switch may also be included in the motor circuit and operated by one of the conveyer chains at each end of its travel; however the reversing switch may be omitted and the hand-switch arranged to reverse the motor or both devices might be used.

The invention will be more readily understood from a reading of the following specification and by reference to the accompanying drawings, in which an example of the invention is illustrated, and wherein—

Figure 1 is a front elevation of a device constructed in accordance with this invention and in position for elevating a load, Fig. 2 is a side elevation of the same, a portion of the truck frame being omitted to show the underlying structure, Fig. 3 is a partial rear elevation and sectional detail of the lower end of the truck, Fig. 4 is a detail of one of the carriers, and Fig. 5 is a circuit diagram of the electric wiring for the switches and motor.

In the drawings the numeral 1 designates an elongated truck frame comprising longitudinal side-rails or members 2 connected by transverse braces or cross bars 3 secured to the inner sides of said rails. Each rail has its upper end reduced and curved to form handle-hooks 4. At the lower end of the truck frame the side-rails are reduced and terminate in serrated segments 5, the teeth of which are designed to bite into the floor and hold the frame in an inclined position, as shown in Fig. 2. Each side-rail comprises spaced longitudinal plates 6 between which a flat metal track 7 is disposed. Near the lower end of each inner plate a flanged bearing sleeve 8 is fastened and has mounted to revolve thereon a truck wheel 9 and supports a transverse shaft 10 held against longitudinal displacement by collars 11 fastened thereon and bearing against the ends of the sleeves 8 to also confine the truck wheels 9. The sleeves 8 are located so that when the truck frame 1 is supported in an inclined position, as shown best in Fig. 2, the truck wheels will be held above the floor, but it is apparent that the truck frame may be swung down to the point where the truck wheels will engage the floor support and the segments 5 out of contact with the floor so that the truck may be readily transported.

On the shaft 10 between the plate 6 sprocket wheels 12 are fastened and support the lower extremities of endless chains 13 having their upper extremities carried on sprocket wheels 14 suitably mounted between the plates adjacent the parts 4. The chains are of the roller type and travel on the track 7 between the edges of the plates 6 which have a slight projection above the track. To each chain an angular carrier 15 is suitably attached and the carriers are positioned so as to aline transversely of the truck. The arms of the carriers will extend outwardly and support the load which may be a bale of cotton as illustrated in Fig. 2. Adjacent the upper extremities of the conveyer chains a roller 16 is mounted between said rails in the path of the load so that as the object elevated is carried on to the roller it will overbalance and be easily pushed therefrom and discharged.

For driving the shaft 10 I mount between the side-rails a driving unit comprising a suitable motor 17 mounted on the under side by a transverse plate 18. The motor shaft 19 drives by means of a housed worm gearing 20 supporting on the under side of the plate 18, a counter shaft 21. The shaft 21 drives the shaft 10 by means of a housed worm gearing 22. The worm gearings 20 and 22 are of common and well known construction and it is not considered necessary to illustrate or describe the same in detail. It is obvious that other means of driving the shaft 10 could be provided, but I prefer to employ the motor unit drive. It will be seen that the motor must be reversed at each end of the travel of the carrier, but it is apparent that obvious extensions of the truck frame would permit a continuous operation of the endless chains. The mechanism for reversing the motor will be hereinafter described.

I shall describe the operation of the elevating truck in connection with lifting bales of cotton, but it is to be understood that this is not a limitation of its use. Bales of cotton are usually handled on ordinary trucks which are wheeled into the cars and the bales dropped off on to the floor. After the first bale has been placed in position as shown in Fig. 2 the elevating truck is wheeled up to the bale and swung into position so that the handle-hooks 4 rest on top of the first bale adjacent its front edge whereby the frame 1 is supported and clearance given to the sprockets 14 and roller 16. When the truck is being transported the parts 4 may be used as handles. The carriers 15 are supposed to be at the lower limit of their travel which would place them adjacent the shaft 10. When the truck frame is swung up into position the serrated segments 5 are swung down and bite into the floor whereby the truck wheels 9 are raised off of the floor. The bale of cotton to be elevated is brought up to the apparatus in the usual manner and pushed over on to the carriers 15 and the chains 13 occupying the position indicated in Fig. 2. The motor 17 is started so that the chains are driven to move the carriers 15 upward whereby the bale of cotton is elevated. When the carriers reach the upper limit of their travel the bale rides on to the roller 16 and is easily pushed over on to the first bale, and the motor is reversed so that the carriers are moved down to the lower end of the frame ready to receive another bale. When it is desired to move the truck it is either swung over in the direction of the arrow (Fig. 2) whereby the truck wheels 9 are brought into engagement with the floor and the segments 5 elevated, or the lower end of the truck frame is lifted and the parts 4 moved from the bale so that the wheels 9 are brought into engagement with the floor. It will be seen that as the load is built up the truck may be moved from place to place and is readily transportable.

It is proposed to place the motor and the elevating device under the direct control of an operator and also to provide for an automatic reversing of the motor in case the operator fails to reverse it. The motor is provided with an electric cable 23 and an attachment plug 24 so that it may be connected to a socket (not shown) but conveniently located. A hand-controller 25 is included in the cable and has a circuit switch 26 whereby the motor may be started and stopped. On the under side of the plate 18 I mount a reversing switch 27 of suitable construction and having a switch lever 28 pivoted to an arm 29 projecting under one of the side-rails 2 from a throw-rod 30. The throw-rod 30 is disposed longitudinally of the said side-rails on the outer plate 6 and is supported to slide through keepers 31. At each end of the throw-rod is a finger 32 projecting at right angles and in the path of a pair of lugs 33 mounted on the correlated carrier 15. It will be seen that as the carrier approaches each end of its travel one of its lugs 33 engages the finger 32 at that end and displaces the rod 30 longitudinally whereby the switch lever 28 is swung and the motor reversed. The controller 25 is also equipped with a suitable reversing switch 34.

In Fig. 5 I have shown a circuit diagram including the motor and switches. The motor illustrated is of the 3-phase type and of suitable construction, but the invention is not to be limited to the use of such a motor.

In Fig. 5 A designates the power circuit which leads to the pole of the switch lever 28 and the motor 17. A motor circuit B leads from the contacts on one side of the switch lever to the motor 17; while a reversed circuit C leads from the contacts on the opposite side of the switch lever and connects with the wires of the circuit B in reversed order. It will be seen that the lever 28 is always in engagement with one of its sets of contacts and when swung engages the other set, whereby the circuit is first broken and then closed in reversed order. The circuit switch 26 is included in the power circuit A. The reversing switch 34 of the hand-controller is slightly different from the reversing switch 27 in that it comprises a pair of contacts D connected in the circuit A and occupying a neutral position so as to be normally engaged by the reversing switch lever 35 of the switch 34 which has connection with two of the wires of the power circuit A. So long as the switch 35 is in engagement with the contacts D and in its neutral position the power circuit A is complete to the reversing switch 27 and the switch 34 is inactive. The switch 34 has connection with the motor circuit B by circuits E and F. The circuit E leading from the contacts on one side of the lever 35 and the circuit F leading from the contacts on the other side of the said lever in reversed order. It is obvious that the switches 27 and 34 must operate independently consequently when the switch lever 35 is moved off of the contacts D by sliding it longitudinally that part of the power circuit leading to the switch 27 is broken and the motor may be then controlled entirely by the switch 34, but as soon as the lever 35 is returned to the neutral contacts D the switch 27 is again connected. The contacts of the circuits E and F are positioned so that the lever 35 must be displaced longitudinally to engage the same when in engagement with the contacts D. It is obvious that the switches 34 would not be needed under ordinary conditions where the switch 27 was used.

What I claim is:—

1. In an elevating truck, the combination of a portable truck frame, truck wheels at the lower end of the frame supporting it for transportation, the lower ends of the frame being serrated to engage the floor when the frame is disposed at an angle and the truck wheels elevated from the floor, supporting members at the upper end of the truck frame, sprockets mounted at each end of the frame on each side thereof, endless chains traveling on the sprockets, load carriers mounted on the chains, an electric motor mounted on the frame, driving connections between the motor and the sprockets of the endless chains, a reversing switch mounted on the frame and connected with the motor, a tripping device operated by one of the endless chains, and operating means connected with the reversing switch and also with the tripping device.

2. In an elevating truck, the combination of a portable truck frame, truck wheels at the lower end of the frame supporting it for transportation, the frame being arranged for supporting against movement in an inclined position, handle hooks at the upper ends of the frame for supporting it on an elevated object, channel tracks at each side of the frame, sprocket wheels at the upper and lower ends of the tracks, sprocket chains traveling in the channel tracks and around the sprockets, load carriers mounted on the chains and riding on the channel tracks, a discharge roller mounted across the upper end of the frame, and a motor mounted on the frame and having driving connection with one of the sprockets of each chain.

In testimony whereof I affix my signature.

JOHN L. ANDERSON.